(12) United States Patent
Masumura et al.

(10) Patent No.: US 12,111,643 B2
(45) Date of Patent: Oct. 8, 2024

(54) INSPECTION SYSTEM, TERMINAL DEVICE, INSPECTION METHOD, AND NON-TRANSITORY COMPUTER READABLE STORAGE MEDIUM

(71) Applicant: KABUSHIKI KAISHA YASKAWA DENKI, Kitakyushu (JP)

(72) Inventors: Ryo Masumura, Kitakyushu (JP); Masaru Adachi, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 568 days.

(21) Appl. No.: 17/408,487

(22) Filed: Aug. 23, 2021

(65) Prior Publication Data

US 2021/0382467 A1    Dec. 9, 2021

Related U.S. Application Data

(63) Continuation of application No. PCT/JP2019/008172, filed on Mar. 1, 2019.

(51) Int. Cl.
*G05B 19/418* (2006.01)
*G06N 20/00* (2019.01)

(52) U.S. Cl.
CPC ....... *G05B 19/41875* (2013.01); *G06N 20/00* (2019.01); *G05B 2219/32368* (2013.01)

(58) Field of Classification Search
CPC .... G05B 19/41875; G05B 2219/32368; G06N 20/00
See application file for complete search history.

(56) References Cited

U.S. PATENT DOCUMENTS

2006/0078191 A1*  4/2006  Matsumura ........ G01N 21/8851
                                                        382/149
2018/0330200 A1    11/2018  Shibata et al.
(Continued)

FOREIGN PATENT DOCUMENTS

| CN | 102129563 | 7/2011 |
| CN | 108873768 | 11/2018 |
| WO | WO 2016/084336 | 6/2016 |

(Continued)

OTHER PUBLICATIONS

International Search Report for corresponding International Application No. PCT/JP2019/008172, Jun. 4, 2019.
(Continued)

*Primary Examiner* — Gary Collins
(74) *Attorney, Agent, or Firm* — MORI & WARD, LLP

(57) ABSTRACT

An inspection system includes machine learning circuitry configured to determine whether each of objects belongs to a predetermined attribute based on feature data of each of the objects, feature data acquisition circuitry configured to acquire feature data of reevaluated objects which are determined to belong to the predetermined attribute without using the machine learning circuitry among excluded objects which are determined not to belong to the predetermined attribute by the machine learning circuitry, and parameter update circuitry configured to update a learning parameter of the machine learning circuitry based on teaching data including the acquired feature data acquired by the feature data acquisition circuitry.

18 Claims, 9 Drawing Sheets

(56) References Cited

U.S. PATENT DOCUMENTS

2019/0252213 A1* 8/2019 Koizumi .............. C25D 17/001
2020/0386690 A1  12/2020 Furihata et al.

FOREIGN PATENT DOCUMENTS

WO   WO 2018/038123   3/2018
WO   WO 2018/154562   8/2018

OTHER PUBLICATIONS

Japanese Office Action for corresponding JP Application No. 2019-535411, Sep. 5, 2019 (w/ English machine translation).
Chinese Office Action for corresponding CN Application No. 201980090799.9, Nov. 30, 2023 (w/ English machine translation).

* cited by examiner

INSPECTION SYSTEM, TERMINAL DEVICE, INSPECTION METHOD, AND NON-TRANSITORY COMPUTER READABLE STORAGE MEDIUM

CROSS-REFERENCE TO RELATED APPLICATIONS

The present application is a continuation application of International Application No. PCT/JP2019/008172, filed Mar. 1, 2019. The contents of this application are incorporated herein by reference in their entirety.

BACKGROUND

Technical Field

The technology disclosed in the present application relates to an inspection system.

Background Art

A product manufactured in a factory or the like is inspected as to whether or not it belongs to a predetermined attribute (for example, a non-defective attribute), and then shipped. In recent years, industrial equipment is often used for such inspection. For example, in a product inspection process, industrial equipment including a machine learning model for determining product quality may be used. In addition, in order to improve the quality determination accuracy, an operation may be performed in which, after an inspection is performed by the inspection apparatus, a product for which a predetermined inspection result (for example, a determination result indicating that the product belongs to a defective product attribute) is obtained is subjected to a detailed inspection again. In such an inspection process, it is important to avoid a situation in which a product determined to belong to the predetermined attribute and shipped does not actually belong to the predetermined attribute.

SUMMARY

According to an aspect of the present invention, an inspection system includes machine learning circuitry configured to determine whether each of objects belongs to a predetermined attribute based on feature data of each of the objects, feature data acquisition circuitry configured to acquire feature data of reevaluated objects which are determined to belong to the predetermined attribute without using the machine learning circuitry among excluded objects which are determined not to belong to the predetermined attribute by the machine learning circuitry, and parameter update circuitry configured to update a learning parameter of the machine learning circuitry based on teaching data including the acquired feature data acquired by the feature data acquisition circuitry.

According to another aspect of the present invention, a terminal device includes a display configured to display feature data of excluded objects which are determined not to belong to a predetermined attribute by a machine learning circuitry which is configured to determine whether each of objects belongs to the predetermined attribute based on feature data of each of the objects, an input unit via which a determiner is configured to input a determination result that the determiner determines whether the excluded objects belong to the predetermined attribute based on the feature data of the excluded objects displayed on the display, and a communication unit configured to transmit the determination result.

According to further aspect of the present invention, an inspection method includes determining whether each of objects belongs to a predetermined attribute based on feature data of each of the objects, acquiring feature data of reevaluated objects which are determined to belong to the predetermined attribute without using the machine learning circuitry among excluded objects which are determined not to belong to the predetermined attribute by the machine learning circuitry, and updating a learning parameter of the machine learning circuitry based on teaching data including the acquired feature data acquired by the feature data acquisition circuitry.

According to the other aspect of the present invention, a non-transitory computer readable storage medium retrievably storing a computer-executable program therein, the computer-executable program causing a computer to perform an inspection method. The inspection method includes determining whether each of objects belongs to a predetermined attribute based on feature data of each of the objects, acquiring feature data of reevaluated objects which are determined to belong to the predetermined attribute without using the machine learning circuitry among excluded objects which are determined not to belong to the predetermined attribute by the machine learning circuitry, and updating a learning parameter of the machine learning circuitry based on teaching data including the acquired feature data acquired by the feature data acquisition circuitry.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
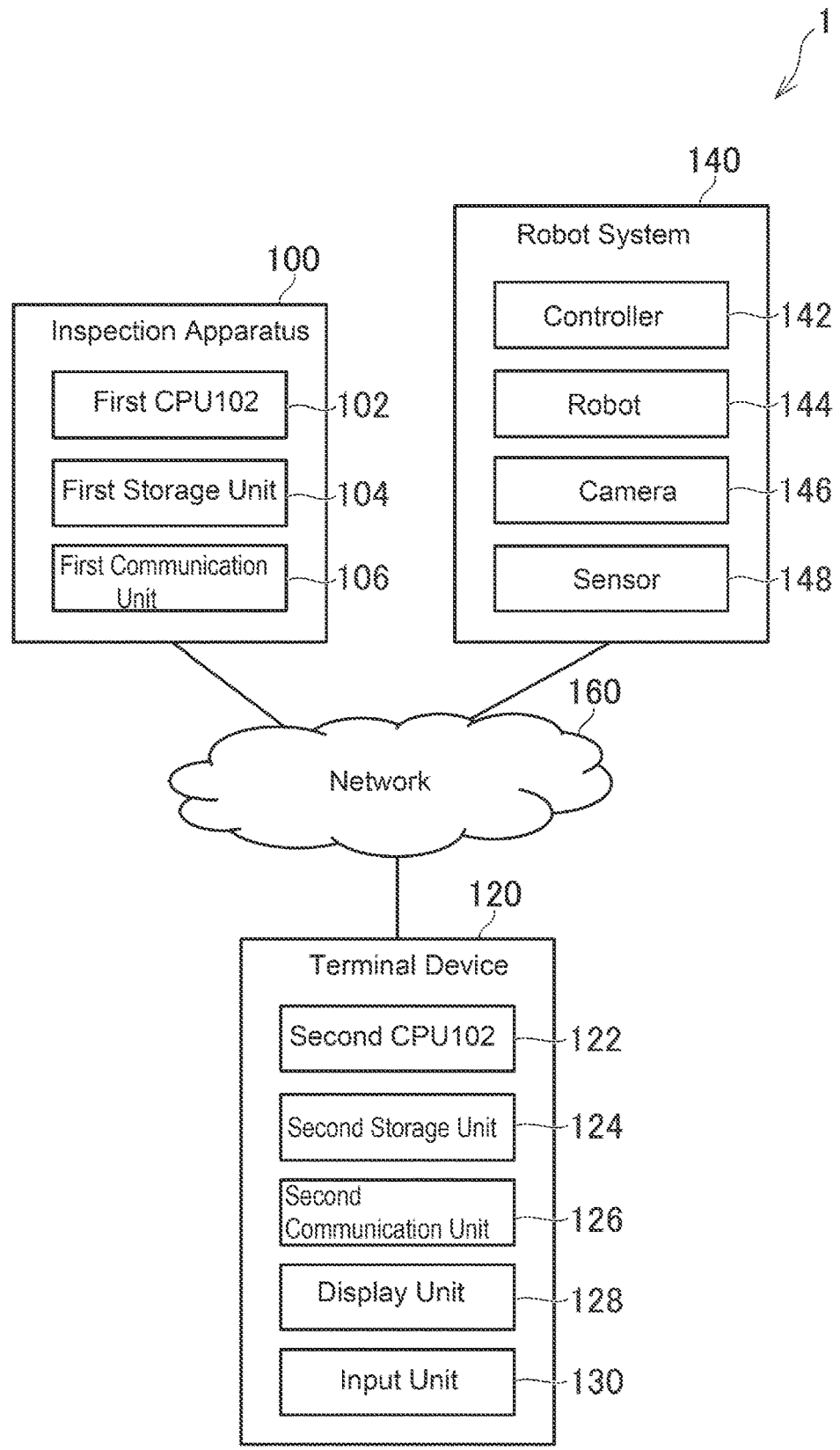
FIG. 1 is a block diagram showing a physical configuration example of an inspection system according to an embodiment of the present invention.

Hereinafter, embodiments will be described with reference to the drawings. In the drawings, the same reference signs denote corresponding or identical components.

FIG. 1 is a diagram illustrating an overall configuration of an inspection system according to an embodiment. As shown in FIG. 1, the inspection system 1 includes an inspection apparatus 100, a terminal device 120, and a robot system 140. Each of the inspection apparatus 100, the terminal device 120, and the robot system 140 is connected to a network 160 such as a LAN or the Internet. FIG. 1 shows one inspection apparatus 100, one terminal device 120, and one robot system 140, a plurality of inspection apparatus 100, however, a plurality of terminal devices 200, and a plurality of robot systems 300 may be provided.

The inspection apparatus 100 is an information processor such as a personal computer, and includes a first CPU 102, a first storage unit 104, and a first communication unit 106. The inspection apparatus 100 may be a server computer that controls the terminal device 120 and the robot system 140.

The first CPU 102 includes at least one processor. The first storage unit 104 includes a volatile memory such as a RAM and a nonvolatile memory such as a hard disk, and stores various programs and data. The first CPU 102 executes various processes based on these programs and data. The first communication unit 106 includes a communication interface such as a network card or various communication connectors, and performs communication with other devices.

The terminal device 120 is a computer operated by a user. In the present embodiment, the user is in a position to manage the entire robot system 140 and is different from an operator in charge of management of each controller 142 and robot 144. However, each operator may correspond to the user. For example, the terminal device 120 is a personal computer, a mobile phone (including a smartphone), or a mobile terminal (including a tablet terminal).

For example, the terminal device 120 includes a second CPU 122, a second storage unit 124, a second communication unit 126, an input unit 130, and a display unit (a display) 128. The hardware configurations of the second CPU 122, the second storage unit 124, and the second communication unit 126 are the same as those of the first CPU 102, the first storage unit 104, and the first communication unit 106, respectively. The input unit 130 is an input device such as a mouse or a keyboard. The display unit 128 is a liquid crystal display, an organic EL display, or the like, and displays various screens in response to an instruction from the second CPU 122.

The robot system 140 includes a controller 142, a robot 144, a camera 146, and a sensor 148. Although FIG. 1 shows one controller 142, one robot 144, one camera 146, and one sensor 148, a plurality of controllers, a plurality of robots, a plurality of cameras, and a plurality of sensors may be provided. For example, the robot system 140 may include a plurality of controllers 142, or one controller 142 may control a plurality of robots 144. The robot system 140 may include a plurality of cameras 146 and a plurality of sensors 148.

The controller 142 is a computer that controls the robot 144. The controller 142 may be a dedicated device specialized for a specific robot 144, but is assumed to be a general-purpose computer in the present embodiment. The controller 142 includes hardware such as a CPU, a RAM, a hard disk, and a communication interface, and sends an operation instruction to the robot 144. The controller 142 may control a plurality of robots 144.

The robot 144 is an industrial robot. The robot 144 may be a general-purpose multi-joint robot, and various types of robots such as a vertical multi-joint type, a horizontal multi-joint type, and a gantry type can be applied. The number of arms of the robot 144 may be arbitrary, and may be only one arm or a plurality of arms. In addition, the robot 144 performs processing on an object (hereinafter, referred to as an object) which is a work target of the robot 144. The robot 144 is, for example, an arc welding robot, and performs a welding process on the object.

The robot 144 is an example of industrial equipment. Therefore, a portion described as the robot 144 in the present embodiment can be read as industrial equipment. Any type of industrial equipment can be applied to the inspection system 1. For example, the industrial equipment may be a motor controller, a servo motor, an inverter, a machine tool, or a programmable logic controller (PLC). The robot 144 is used in a manufacturing process or an inspection process in a factory.

The camera 146 and the sensor 148 acquire feature data of the object. The feature data includes, for example, image data and motion data.

The camera 146 captures an image of the object and acquires image data. Specifically, for example, when the robot 144 is a welding robot, the camera 146 captures an image of a welded portion of the object.

The sensor 148 acquires operation data when processing is performed on the object. The operation data includes vibration data and time-series data. Specifically, for example, the sensor 148 is a torque sensor, a motor encoder, a proximity sensor, a grip sensor, a pressure-sensitive sensor, a motion sensor, a sputtering sensor, or a temperature sensor. In a case where the robot 144 is an arc welding robot, the sensor 148 acquires vibration data indicating a positional change of the robot 144 during the welding process and time-series data such as a welding current waveform and a welding voltage waveform. The motion data may be data indicating the motion of the robot 144, and may indicate various information such as a torque signal, temperature information, a speed feedback value, an external force value, or a feedback pulse signal.

The program and data described as being stored in each of the inspection apparatus 100, the terminal device 120, and the controller 142 may be supplied via the network 160. The hardware configuration of each of the inspection apparatus 100, the terminal device 120, and the controller 142 is not limited to the example described above, and various types of hardware can be applied. For example, a reading unit (for example, an optical disk drive or a memory card slot) that reads a computer-readable information storage medium or an input/output unit (for example, a USB terminal) for directly connecting to an external device may be included. In this case, the program or data stored in the information storage medium may be supplied via the reading unit or the input/output unit.

Next, the function of the inspection system 1 will be described. The inspection system 1 acquires operation data and image data measured by the robot 144 and executes an application for analyzing the object. These applications may be created by a manufacturer or may be created by a user and added to the inspection apparatus 100. The application collects operation data and image data of the robot 144 and stores them in the hard disk, and determines whether or not the object belongs to the predetermined attribute using the operation data and the image data.

Figure 2:
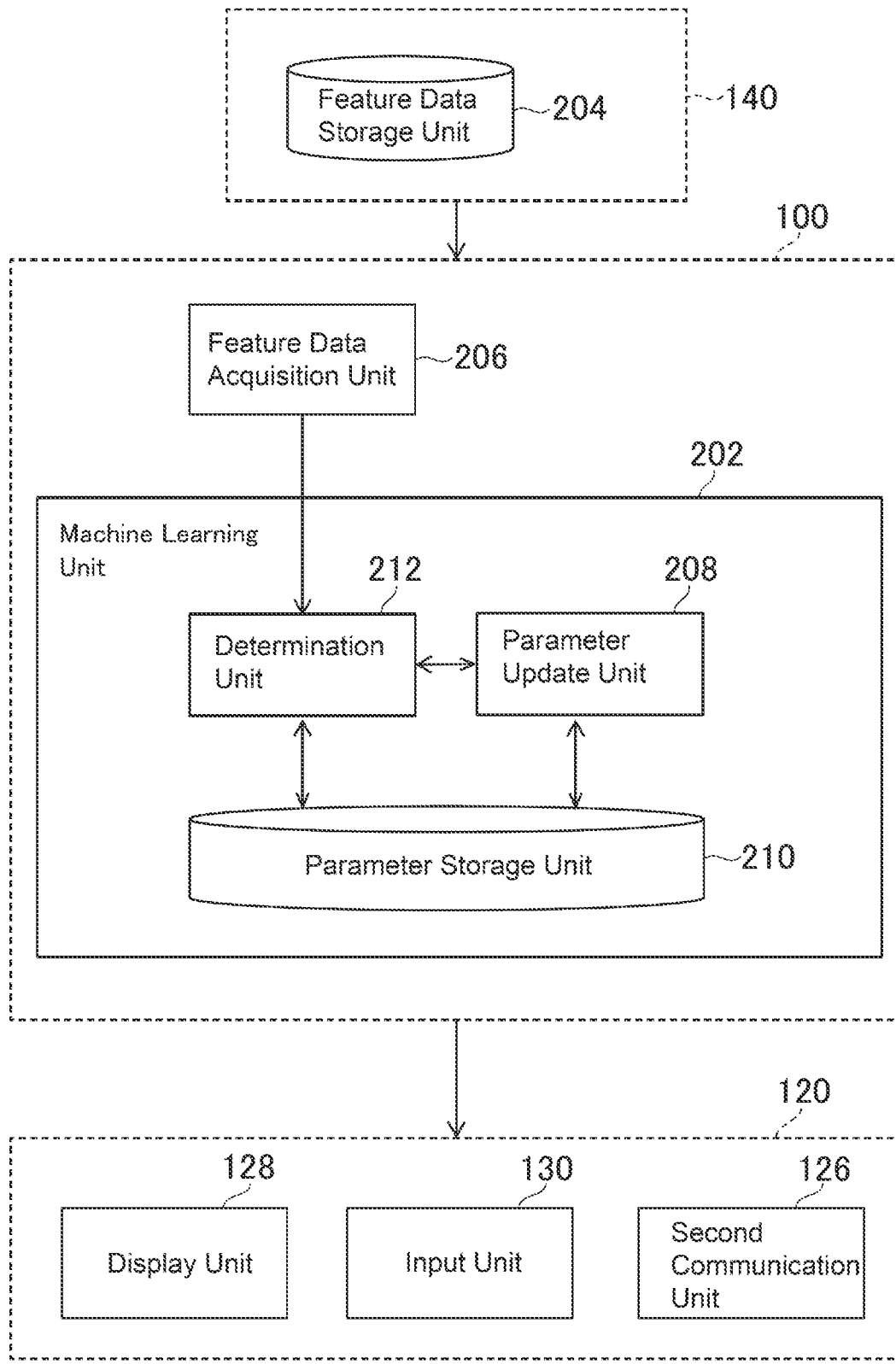
FIG. 2 is a block diagram showing a configuration example of the inspection system according to the embodiment of the present invention.

FIG. 2 is a block diagram showing a configuration example of the inspection system 1 according to the embodiment of the present invention. As illustrated in FIG. 2, the inspection system 1 includes a machine learning unit (machine learning circuitry) 202, a feature data storage unit (feature data storage) 204, a display unit 128, an input unit 130, a second communication unit 126, and a feature data acquisition unit (feature data acquisition circuitry) 206.

The machine learning unit 202 is a machine learning model learned in advance (hereinafter referred to as first learning) based on basic teaching data. For example, the machine learning unit 202 is a machine learning model implemented by a convolutional neural network (CNN). The entire neural network consists of an encoder network and a decoder network. The machine learning unit 202 may be a machine learning model other than the CNN.

The machine learning unit 202 includes a parameter update unit (parameter update circuitry) 208, a parameter storage unit 210, and a determination unit 212. The parameter update unit 208 updates the learning parameter of the machine learning device based on the teaching data including the feature data acquired by the feature data acquisition unit 206. Details of the update of the learning parameter will be described later.

The parameter storage unit 210 stores values of parameters of the machine learning unit 202. When learning is executed, the values of the parameters stored in the parameter storage unit 210 are updated as needed. In a case where the learning is repeatedly performed and the determination accuracy is not improved even if the learning is further performed, the parameter in the state may be stored in the parameter storage unit 210 as a fixed value.

The determination unit 212 determines whether each of the plurality of objects belongs to the predetermined attribute based on the feature data of each of the plurality of objects. Specifically, for example, the determination unit determines whether each of the plurality of objects belongs to the predetermined attribute based on the image data acquired by the camera 146 or the operation data acquired by the sensor 148. The predetermined attribute is, for example, a non-defective item attribute indicating that the object has a predetermined quality.

Note that the predetermined attribute may be information indicating hierarchy to which the object belongs. For example, in a case where a hierarchy having the highest quality is rank A, a hierarchy having medium quality is rank B, and a hierarchy having low quality is rank C, the predetermined attribute may be information indicating any of rank A, rank B, and rank C. In this case, the determination unit 212 determines whether or not the object belongs to any one of the A rank, the B rank, and the C rank using the operation data or the image data. Hereinafter, a case where the predetermined attribute mainly represents a non-defective item attribute will be described.

Figure 3:
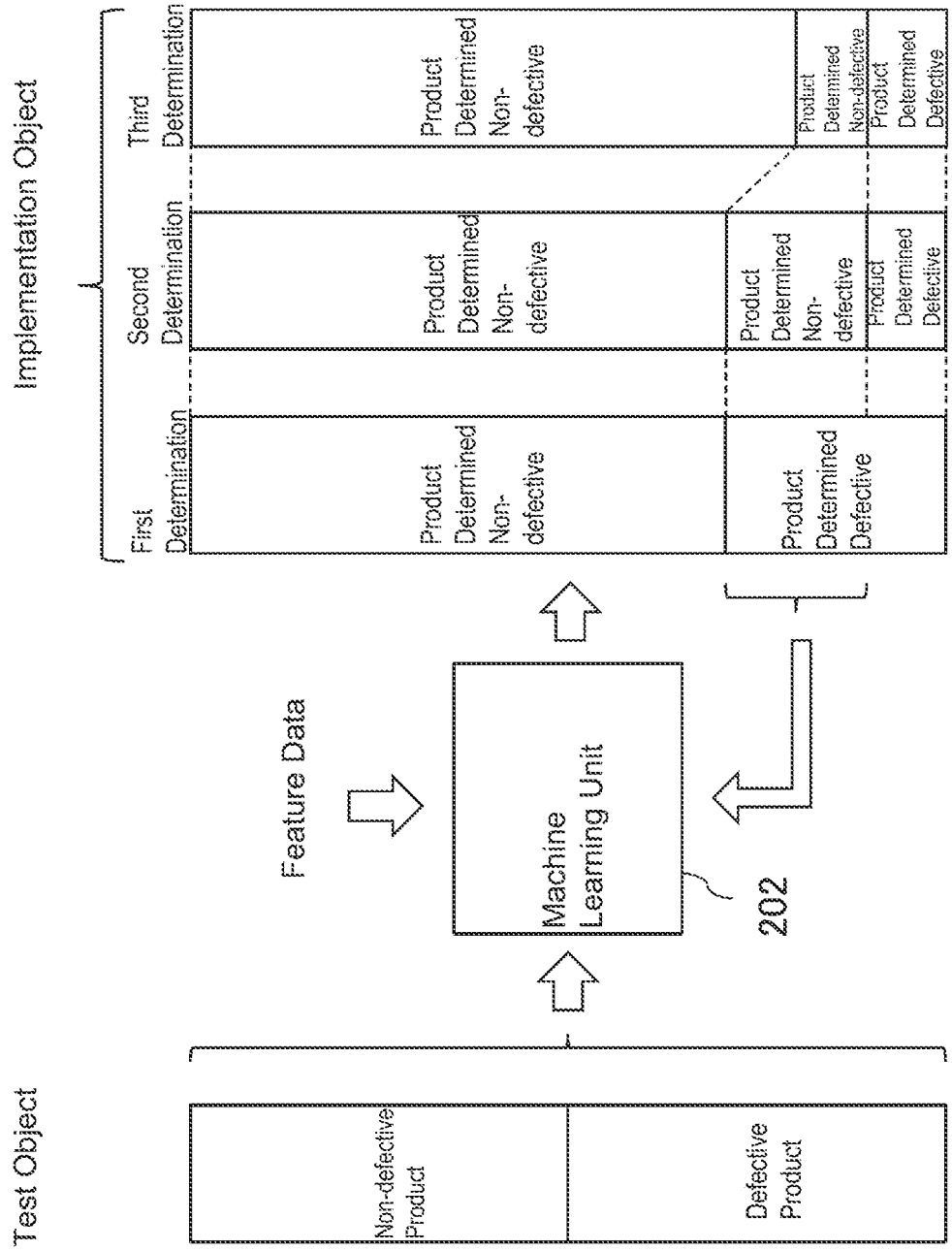
FIG. 3 is a diagram illustrating teaching data input to the machine learning unit and a determination result.

FIG. 3 is a diagram illustrating teaching data input to the machine learning unit 202 and a determination result. The basic teaching data used in the first learning is data acquired from the target object (hereinafter, referred to as a test object 900) prepared in advance for execution of the first learning by the machine learning unit 202. The basic teaching data includes operation data, image data, and information indicating whether or not the basic teaching data belongs to the predetermined attribute. It is proven in advance whether or not the test object belongs to the predetermined attribute. The information indicating whether or not the information belongs to the predetermined attribute is represented by a value of 0 when the information belongs to the predetermined attribute, and is represented by a value of 1 when the information does not belong to the predetermined attribute, for example.

In the first learning, first, the motion data and the image data included in the basic teaching data are input to the determination unit 212, and the score is calculated. Here, the score is a value indicating a degree of belonging to the predetermined attribute, and is, for example, an output value of the CNN. Then, a comparison result (hereinafter referred to as an error) between information indicating whether or not the object belongs to the predetermined attribute and the score is identified. The error may be data having a value of 0 or more and 1 or less. The error may be, for example, data that takes 1 as a value when the calculated score and the information indicating whether or not the calculated score belongs to the predetermined attribute match, and takes 0 as a value when the calculated score and the information indicating whether or not the calculated score does not match. Further, based on the error, the parameter update unit 208 updates the value of the parameter stored in the parameter storage unit 210 by, for example, an error back-propagation method. In addition, a plurality of combinations of operation data and image data and information indicating whether or not the data belongs to the predetermined attribute are input to the determination unit. Thus, the parameter value of the determination unit is repeatedly updated. As described above, the first learning of the machine learning unit 202 is executed.

The determination unit 212 of the machine learning unit 202 in which the first learning has been executed determines whether or not the plurality of objects belong to the predetermined attribute (hereinafter, referred to as first determination). Specifically, for example, first, the machine learning unit 202 in which the first learning has been executed calculates a score for each of a plurality of objects (hereinafter, referred to as implementation objects) that are determination targets of whether or not the object belongs to a predetermined attribute. The determination unit 212 inputs the motion data and the image data to the neural network for each implementation objects, and outputs a numerical value of 0 or more and 1 or less as the score of the object. Next, the determination unit 212 determines whether or not the score belongs to the predetermined attribute based on whether or not the score is greater than a predetermined first threshold value. For example, the determination unit 212 determines that the object belongs to the defective item attribute when the score of the object is greater than a predetermined first threshold value, and determines that the object 900 belongs to the non-defective item attribute when the score is equal to or less than the predetermined first threshold value.

The feature data storage unit 204 stores feature data acquired by the robot system 140. Specifically, the feature data storage unit 204 stores image data acquired by the camera 146 or operation data acquired by the sensor 148. FIG. 2 illustrates a configuration in which the feature data storage unit 204 is included in the robot system 140, however, the feature data storage unit 204 may be included in the inspection apparatus 100 or the terminal device 120.

The display unit 128 displays the feature data of the object. Specifically, for example, the display unit 128 displays the feature data of the object for which the determination result that the object does not belong to the predetermined attribute is obtained in the inspection apparatus 100. In the above example, the display unit 128 displays the feature data of the implementation object determined to belong to the defective item attribute in the first determination.

The input unit 130 receives a result of determination by an operator (hereinafter, referred to as a determiner) as to whether or not the operator belongs to the predetermined attribute. Specifically, for the object for which the determination result that the object does not belong to the predetermined attribute is obtained in the inspection apparatus 100, the determination result of whether or not the object belongs to the predetermined attribute by the determiner based on the feature data displayed by the display unit 128 is input to the input unit 130. That is, the implementation object for which the determination result that the implementation object does not belong to the non-defective item attribute is obtained in the first determination is determined again by the determiner whether or not the implementation object belongs to the non-defective item attribute without depending on the machine learning unit 202 (hereinafter, referred to as second determination). The input unit 130 receives an input of the determination result by the determiner.

In addition, it is desirable that the second determination is executed by a method having higher accuracy than the first determination. The method of acquiring the determination result may be performed by a method other than the method in which the determiner inputs the determination result to the input unit 130. For example, the above-described determination may be executed by an operation of a program that determines whether or not data belongs to the predetermined attribute using data having a larger data size than the image data or the operation data used in the first determination (for example, image data or operation data having a higher resolution than the image data or the operation data used in the first determination).

The second determination may be performed by a machine learning model other than the inspection apparatus 100. In the machine learning model, it is desirable that learning is performed using feature data of the target object for which different determination results are obtained in the first determination and the second determination. Here, the accuracy of the second determination can be improved by implementing learning with feature data that has larger size than that of the machine learning unit 202, the accuracy of the second determination can be improved. In this case, it is possible to shorten the processing required for the second determination as compared with the determination by the determiner described later. Thus, the bottleneck of the production line in the factory can be avoided, and the process working time can be made uniform.

The second communication unit 126 transmits the determination result input to the inspection apparatus 100. Specifically, the second communication unit 126 transmits, to the machine learning unit 202, information indicating whether or not the information belongs to the non-defective item attribute input to the input unit 130.

The feature data acquisition unit 206 acquires the feature data of the object for which the determination result that the object belongs to the predetermined attribute is obtained regardless of the machine learning unit 202 among the objects for which the determination result that the object does not belong to the predetermined attribute is obtained by the machine learning unit 202. Specifically, first, the machine learning unit 202 in which the first learning has been executed as described above performs the first determination as to whether or not the implementation target belongs to the non-defective item attribute. As shown in FIG. 3, in the first determination, it is determined that a certain percentage of the implementation objects belong to the non-defective item attribute and the remaining implementation objects belong to the defective item attribute. Next, the second determination is performed on the implementation object determined to belong to the defective item attribute in the first determination. Then, the feature data acquisition unit 206 acquires feature data of the implementation object determined to belong to the defective item attribute in the second determination. For example, the feature data acquisition unit 206 acquires image data acquired by the camera 146 or operation data acquired by the sensor 148 for the object from the feature data storage unit 204 via the communication unit 106.

Although the feature data acquisition unit 206 is included in the inspection apparatus 100 in the present embodiment, the feature data acquisition unit 206 may acquire all the feature data acquired by the camera 146 and the sensor 148 from the robot system 140. In this case, the feature data acquisition unit 206 may pass only feature data used as teaching data to the machine learning unit 202.

Figure 4:
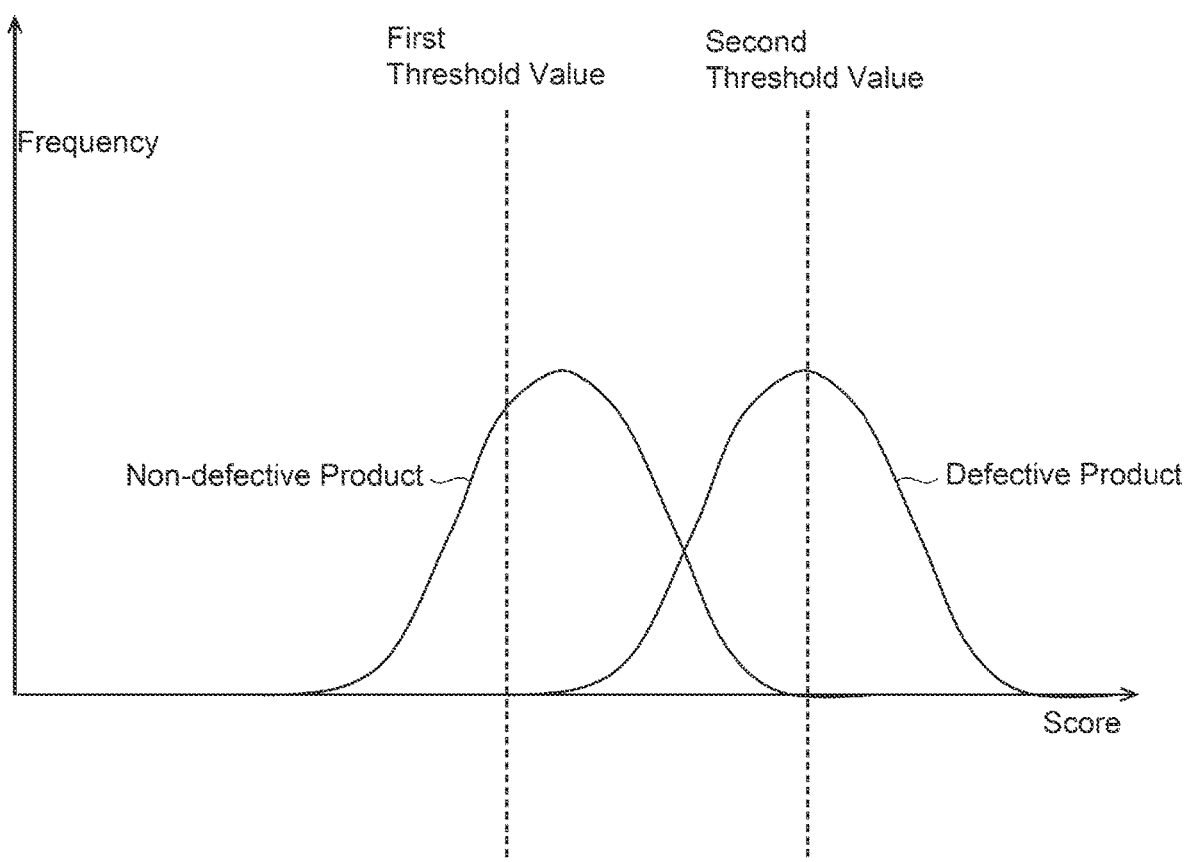
FIG. 4 is a histogram of scores of the implementation object calculated by the determination unit in which the first learning has been executed.

FIG. 4 is a histogram of the score of the implementation object calculated by the determination unit 212 in which the first learning has been executed. In FIG. 4, the horizontal axis represents the score, and the vertical axis represents the frequency. The distribution representing the object belonging to the non-defective item attribute has a peak on the lower score side, and the distribution representing the defective item has a peak on the higher score side. The distribution of non-defective products or defective products shown in FIG. 4 is obtained by separating the distributions of non-defective products and defective products based on the result of determining whether the object 900 belongs to the non-defective product attribute or the defective product attribute by the error-free determination method. The actual histogram is a sum of distributions of non-defective products and defective products.

As described above, in the second determination, it is determined whether the object belongs to the non-defective item attribute or the defective item attribute with respect to the object distributed on the right side of the first threshold value in the entire distribution of FIG. 4. Here, it is desirable that the object which is determined to belong to the defective item attribute despite being a non-defective item and the object which is determined to belong to the non-defective item attribute despite being a defective item do not exist. However, as a result of the determination by the machine learning unit 202, the distributions of non-defective products and defective products usually overlap each other. When the overlap exists, the score of a part of the object which is a non-defective product becomes larger than the score of a part of the object which is a defective product.

Therefore, it is desirable that the probability of the machine learning unit 202 determining that the object belonging to the predetermined attribute does not belong to the predetermined attribute is higher than the probability of the machine learning unit 202 determining that the object not belonging to the predetermined attribute belongs to the predetermined attribute for the test teaching data group. In particular, it is desirable that the predetermined first threshold value is set such that the probability that the object that does not belong to the predetermined attribute is determined to belong to the predetermined attribute by the machine learning unit 202 is substantially 0% with respect to the teaching data group for a test. By setting such a first threshold value, it is possible to prevent a defective product from being erroneously determined to belong to the non-defective product attribute.

It should be noted that "substantially 0%" is a concept including not only 0% but also an allowable error for the inspection system 1. Specifically, when an error of several % (for example, 3%) is allowed as the accuracy required for the inspection system 1, "substantially 0%" means that the error is equal to or less than several % (for example, equal to or less than 3%).

For example, in a case where 0.5 is set as the predetermined first threshold value, it is desirable that the determination unit 212 determines that the probability that the object is a non-defective product is 100% when the score is 0.5 or less. That is, it is desirable that the determination unit 212 determines that the object belongs to the attribute of a defective product when the score of the object is larger than 0.5, and determines that the object belongs to the attribute of a non-defective product when the score of the object is equal to or smaller than 0.5.

However, when the first threshold value is set as described above, an erroneous determination is made that a part of the non-defective objects (in FIG. 4, the objects distributed on the right side of the first threshold value in the distribution of non-defective items) belongs to the defective item attribute in the first determination. That is, since the result of the first determination is not necessarily correct, in the second determination, it is determined that a certain percentage of the implementation objects belong to the non-defective item attribute and the remaining implementation objects belong to the defective item attribute. Therefore, in FIG. 4, the object distributed on the left side of the first threshold in the distribution of non-defective products is determined to belong to the non-defective product attribute.

Therefore, the machine learning unit 202 executes repetitive learning (hereinafter, learning performed n-th time is referred to as n-th learning) based on teaching data including feature data acquired by the feature data acquisition unit 206. Hereinafter, the second learning performed for the second time and the third learning performed for the third time will be described.

The second learning is executed using teaching data acquired based on the object determined to belong to the non-defective item attribute in the second determination among the objects determined to belong to the defective item attribute in the first determination illustrated in FIG. 3. Specifically, in FIG. 4, the second learning is executed based on the feature data of the object distributed on the right side of the first threshold value in the distribution of non-defective products. Similarly to the first learning, the teaching data is motion data and image data of the target object and information indicating whether or not the target object belongs to the predetermined attribute. The second learning is executed in the same manner as the first learning except that teaching data to be used is different.

Figure 5:
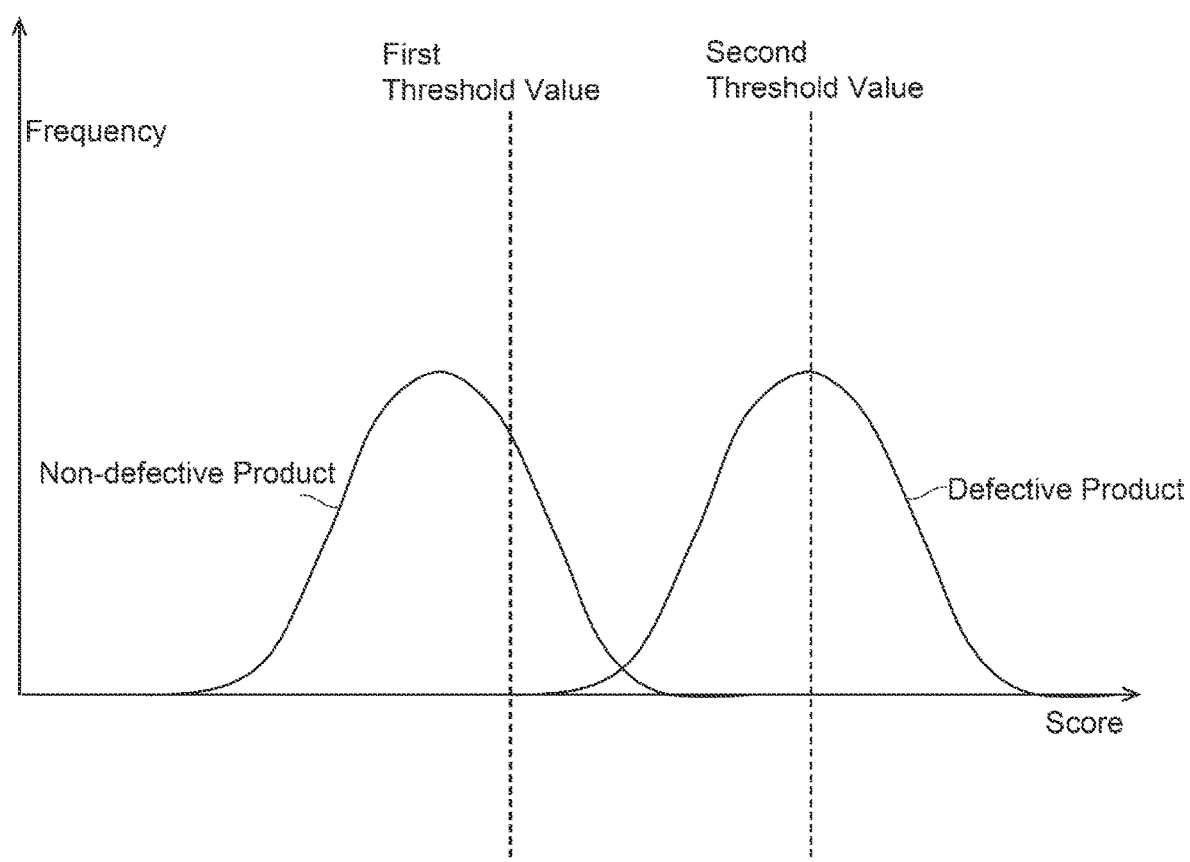
FIG. 5 is a histogram of scores of the implementation object calculated by the determination unit in which the second learning has been executed.

FIG. 5 is a histogram of the score of the implementation object calculated by the determination unit 212 in which the second learning has been executed. The determination unit 212 that has already performed the second learning determines whether or not the score belongs to the predetermined attribute based on whether or not the score is greater than a predetermined first threshold (hereinafter referred to as a third determination).

The second learning is executed by using the teaching data of the target object determined to belong to the defective item attribute in spite of the non-defective item in the first determination. Therefore, the distribution of non-defective products and the distribution of defective products shown in FIG. 5 are more distant than the distribution of non-defective products and the distribution of defective products shown in FIG. 4. As a result, as shown in FIG. 5, in the second determination, the ratio of the objects that are determined to belong to the defective item attribute despite being non-defective items can be made smaller than the ratio in the first determination. That is, it is possible to improve the accuracy of determining that the non-defective product belongs to the non-defective product attribute while preventing erroneous determination that the defective product belongs to the non-defective product attribute by the second learning.

Subsequently, the third learning is executed. The third learning is executed based on the teaching data including the feature data of the object for which the determination result that the object does not belong to the predetermined attribute is obtained regardless of the machine learning device among the objects for which the determination result that the object does not belong to the predetermined attribute is obtained by the machine learning device. Specifically, the object for which the determination result that the object does not belong to the predetermined attribute is obtained regardless of the machine learning device is selected from the objects for which the determination result that the object does not belong to the predetermined attribute is obtained by the machine learning device based on the degree to which the object belongs to the predetermined attribute. For example, the object is selected by comparing the score with a predetermined second threshold value.

Specifically, for example, in FIG. 5, the third learning is executed based on the feature data of the object distributed on the right side of the first threshold in the distribution of non-defective products and the object distributed on the left side of the second threshold in the distribution of defective products. Similarly to the first learning and the second learning, the teaching data is motion data and image data of the target object and information indicating whether or not the target object belongs to the predetermined attribute. The third learning is executed in the same manner as the first learning and the second learning except that teaching data to be used is different.

Figure 6:
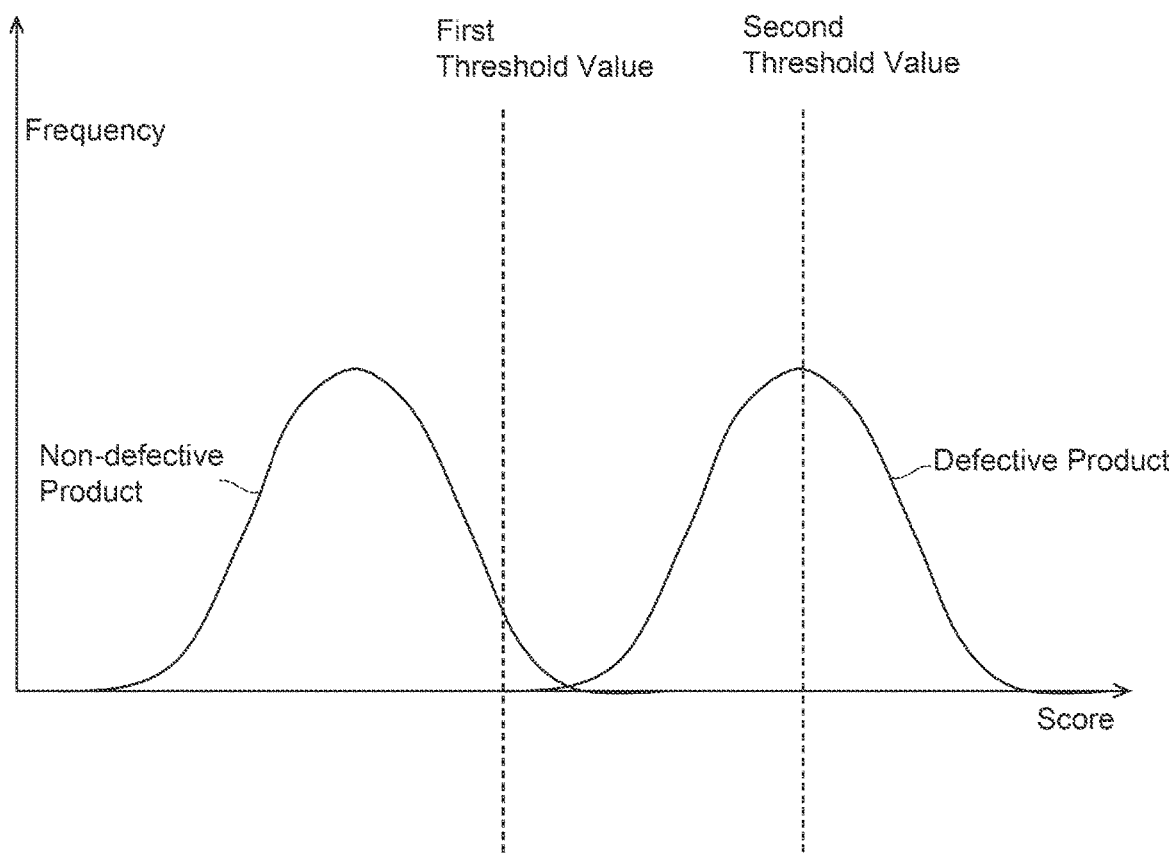
FIG. 6 is a histogram of scores of the implementation object calculated by the determination unit in which the third learning has been executed.

FIG. 6 is a histogram of the score of the implementation object calculated by the determination unit 212 in which the third learning has been executed. In the third learning, learning is performed using feature data of the target object, which is a score between the first threshold and the second threshold in FIG. 5, as teaching data. Since the second threshold value is set at the peak position of the distribution of defective products, the feature data of the target object belonging to the defective product attribute having a score far away from the first threshold value is not used as teaching data in the third learning. That is, while the feature data of the object that clearly belongs to the defective item attribute is excluded from the teaching data, the feature data of the object that belongs to the defective item attribute but is relatively close to the non-defective item is included in the teaching data. Thus, as shown in FIG. 6, it is possible to further improve the accuracy of determining that a non-defective product belongs to the non-defective product attribute while preventing erroneous determination that a defective product belongs to the non-defective product attribute.

Figure 7:
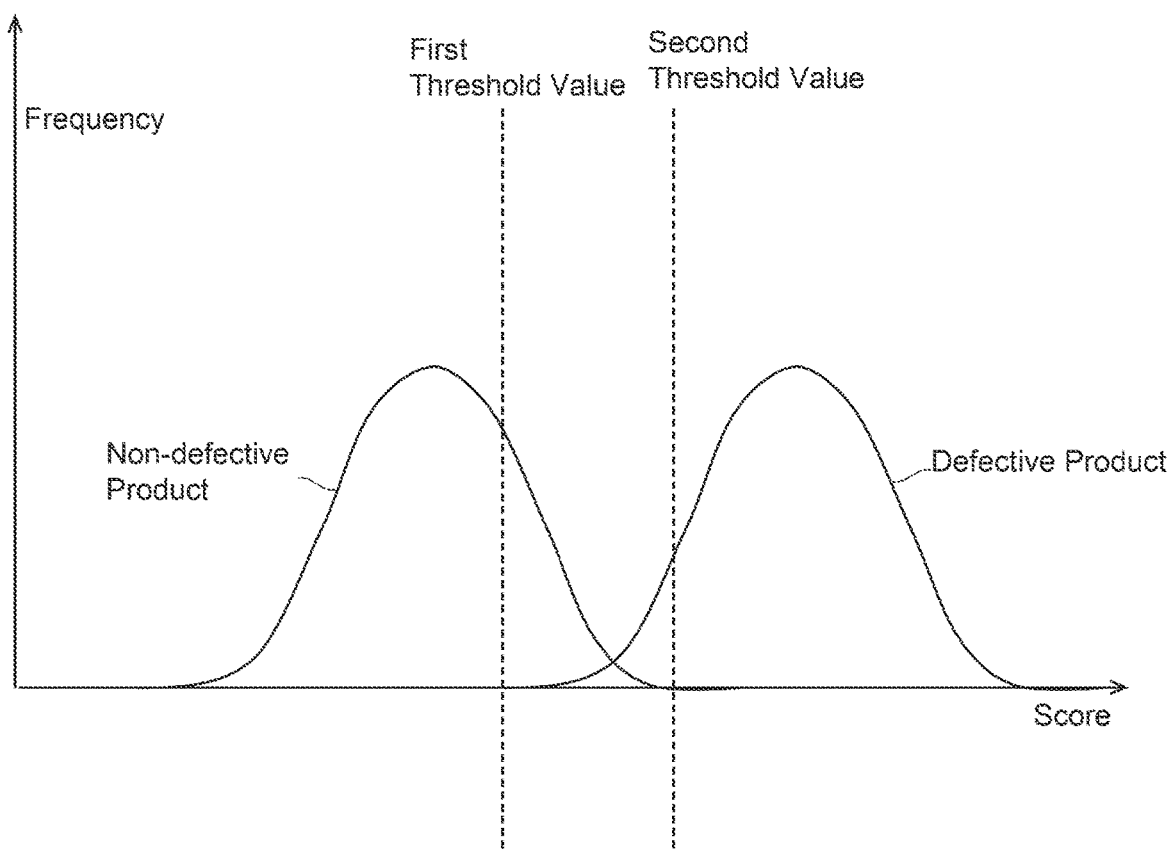
FIG. 7 is a histogram of scores of the implementation object calculated by the determination unit in which the second learning has been executed.

The second threshold may be set at a position other than the peak position of the distribution of defective products. For example, as illustrated in FIG. 7, the second threshold may be set such that the probability that the object belonging to the non-defective item attribute is determined to belong to the defective item attribute by the machine learning unit 202 is substantially 0%. That is, the second threshold value may be the score at the position of the right skirt of the distribution of non-defective products.

In addition, the second threshold may be set such that the number of objects for which the determination result that the object does not belong to the predetermined attribute regardless of the machine learning device is obtained and the number of objects for which the determination result that the object belongs to the predetermined attribute regardless of the machine learning device are substantially the same. The meaning of the term "substantially" is the same as described above.

In this case, the parameter update unit 208 updates the learning parameter of the machine learning device based on the teaching data including the feature data extracted such that the number of the feature data of the object for which the determination result that the object does not belong to the predetermined attribute regardless of the machine learning device is substantially the same as the number of the feature data of the object for which the determination result that the object belongs to the predetermined attribute regardless of the machine learning device.

The n-th learning may be executed by further using other teaching data. Specifically, for example, the parameter update unit 208 may further update the learning parameter of the machine learning unit 202 based on the teaching data including the feature data of the target object for which the determination result of belonging to the predetermined attribute is obtained by the machine learning unit 202. Specifically, the second learning may be executed based on not only the object determined to belong to the predetermined attribute in the second determination but also the object determined to belong to the predetermined attribute in the first determination. Specifically, in the above example, the second learning may be executed based on the feature data of the object distributed on the right side of the first threshold value and the object distributed on the left side of the first threshold value in the distribution of non-defective products in FIG. 4.

That is, the second learning may be executed using the image data and the operation data of all the objects determined to belong to the non-defective item attribute in the first determination and the second determination as teaching data. Accordingly, when the score of the object determined to belong to the non-defective item attribute in the first determination is a value near the first threshold value, it is possible to reduce the possibility that the determination unit 212 after the second learning is executed determines that the object belongs to the defective item attribute. Thus, the accuracy of determination can be further improved.

The parameter update unit 208 may further update the learning parameter of the machine learning unit 202 based on at least a part of the basic teaching data. Specifically, the second learning may be executed based on the feature data of the object belonging to the non-defective attribute among the test objects together with the object distributed on the right side of the first threshold in the distribution of the non-defective items in FIG. 4. Thus, the accuracy of determination can be further improved.

As described above, the learning parameters of the machine learning unit 202 are updated by iterative learning. Here, it is desirable that the parameter update unit 208 updates the learning parameter of the machine learning unit 202 so as to suppress an increase in the probability of obtaining the determination result that the object that does not belong to the predetermined attribute belongs to the predetermined attribute with respect to the teaching data group for a test.

Specifically, first, the parameter update unit 208 generates a plurality of types of parameter candidates using a plurality of types of teaching data for each learning. Here, the plurality of types of teaching data are data obtained by combining the various feature data described above. Next, the determination unit 212 determines whether or not the plurality of objects determined before the learning belong to the predetermined attribute using the plurality of types of parameter candidates. As a result, that the determination result that the object which does not belong to the predetermined attribute belongs to the predetermined attribute is obtained for each parameter candidate. Then, the parameter update unit 208 stores, in the storage unit, the parameter having the lowest probability of obtaining the determination result that the object not belonging to the predetermined attribute belongs to the predetermined attribute. As a result, it is possible to prevent a decrease in the accuracy of determination due to overlearning.

Next, an inspection method executed using the inspection system 1 will be described with reference to FIGS. 8 and 9. Here, it is assumed that the machine learning unit 202 has already performed the first learning.

First, processing is executed (S802). Specifically, for example, as illustrated in FIG. 9, a transport device 902 that transports the object 900 is disposed in a manufacturing line of a factory. The transport device 902 is, for example, a belt conveyor. A plurality of objects 900 included in the first lot flow on the transport device 902. The robot 144 of the robot system 140 includes a processing part 141 for executing, for example, a welding process on the plurality of objects 900. At this time, the camera 146 of the robot system 140 captures an image of the joint portion of the object 900 after the welding process, and acquires image data. In addition, the sensor 148 acquires operation data such as vibration data showing a change in position of the robot 144 during the welding process. The feature data storage unit 204 stores the image data and the motion data.

Next, the machine learning unit 202 determines whether each of the plurality of objects 900 belongs to the predetermined attribute based on the feature data of each of the plurality of objects 900 (S804). To be more specific, the feature data acquisition unit 206 acquires the image date and the motion date acquired in the S802 from the robot system 140 via the network 160. The machine learning unit 202 that has already performed the first learning calculates a score based on the image data and the motion data. The machine learning unit 202 determines whether each object 900 belongs to the non-defective item attribute or the defective item attribute based on whether the score is larger than a predetermined first threshold (first determination).

Next, in the S804, the determination is performed on the object 900 for which the determination result that the object does not belong to the predetermined attribute is obtained by the machine learning unit 202, without depending on the machine learning unit 202 (S806). To be more specific, for all the objects 900 determined to belong to the defective item attribute in the S804 process, the characteristic information of the objects 900 is displayed on the display unit 128. Here, the display unit 128 displays feature data of one object 900 closest to the determiner among the conveyed objects 900. For example, the object 900 conveyed to the position of the determiner is specified based on data such as EPR. Then, the feature data acquisition unit 206 acquires the feature data of the object 900 from the robot system 140 and transmits the feature data to the terminal device 120. Thus, the display unit 128 displays the feature data of the one object 900 closest to the determiner. Then, the determiner visually observes the feature data displayed on the display unit 128 and decides whether the object 900 belongs to the non-defective item attribute or the defective item attribute. Further, the input unit 130 receives an input of a determination result by the determiner as to whether or not the attribute belongs to the predetermined attribute (second determination).

Since the feature data is displayed on the display unit 128, the determiner can easily perform a determination. In addition, since the feature data of the object 900 closest to the determiner is displayed on the display unit 128, it is possible to prevent an erroneous decision on the object 900. Therefore, as a result of the second determination, it is possible to prevent feature data related to an erroneous object 900 from being collected.

Note that one object 900 closest to the determiner may be specified by the barcode reader or the RSF tag reading device reading information for identifying the object 900.

Next, the feature data acquisition unit 206 acquires teaching dataset used for the second learning (S808). To be more specific, the feature data acquisition unit 206 acquires the image and operation of the object 900 for which the determination result in the S806 belongs to the non-defective attribute. Here, for example, m (m is a natural number) teaching data groups are acquired. One teaching data group includes motion data and image data acquired from one target object 900. Hereinafter, an i-th (1≤I≤m) data group is referred to as an i-th data group.

Next, the machine learning unit 202 sets the value of the variable j to 1 (S810). Then, the machine learning unit 202 executes the learning of the learning unit using the teaching data included in the i-th dataset group (S812).

Then, the machine learning unit 202 checks whether or not the value of the variable i is m (S814). When the value is not m (S814: N), the machine learning unit 202 increases the value of the variable i by 1 (S816), and returns to the process shown in S812. If the value is m (S814: Y), the process proceeds to S818. In the process from S810 to S816, the machine learning unit 202 executes the second learning.

Next, processing is performed on a plurality of objects 900 different from the object 900 to be processed in the S802 (S818). Specifically, the robot 144 performs processing such as welding on a plurality of objects 900 included in the second lot flowing in the manufacturing line of the factory, with respect to the objects 900. Then, image data and motion data are acquired based on the object 900.

In addition, the third determination for determining whether or not the plurality of objects 900 belong to the predetermined attribute is performed by the determination unit 212 in which the second learning has been performed (S820). The processes of S818 and S820 are the same as the processes of S802 and S804 except that the learning unit has already performed the second learning and the object 900 is different.

As described above, according to the present embodiment, it is possible to determine whether or not the object 900 belongs to the predetermined attribute with high accuracy by performing learning using the selected teaching data. As a result, for example, in the case where a determiner performs determination, it is possible to reduce the number of objects 900 to be determined by the determiner whether it belongs to the non-defective item attribute or the defective item attribute. As a result, the number of determiners can be reduced, and thereby the manufacturing cost can be reduced.

Figure 8:
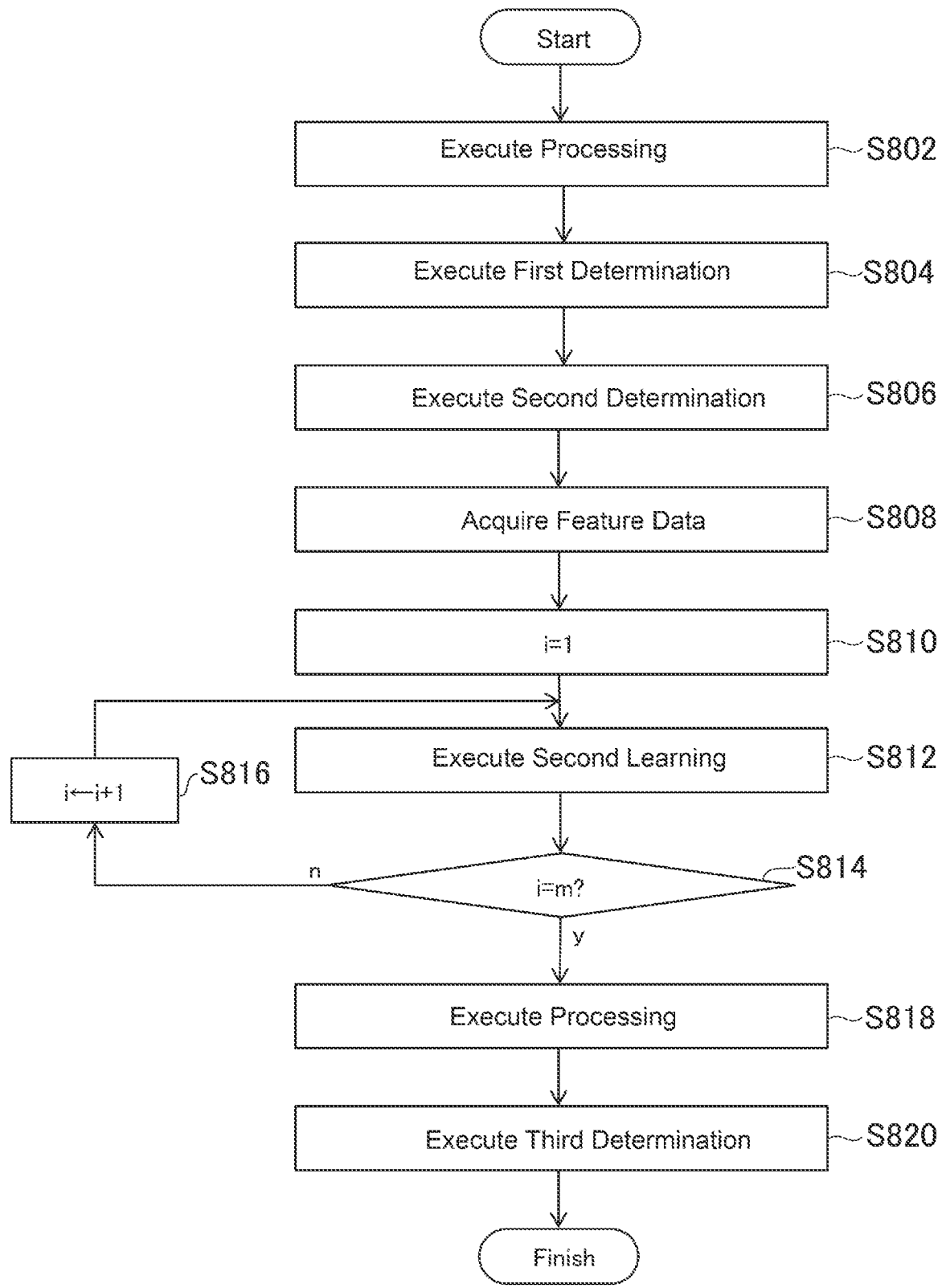
FIG. 8 is a flowchart showing an example of an inspection method according to an embodiment of the present invention.
Figure 9:
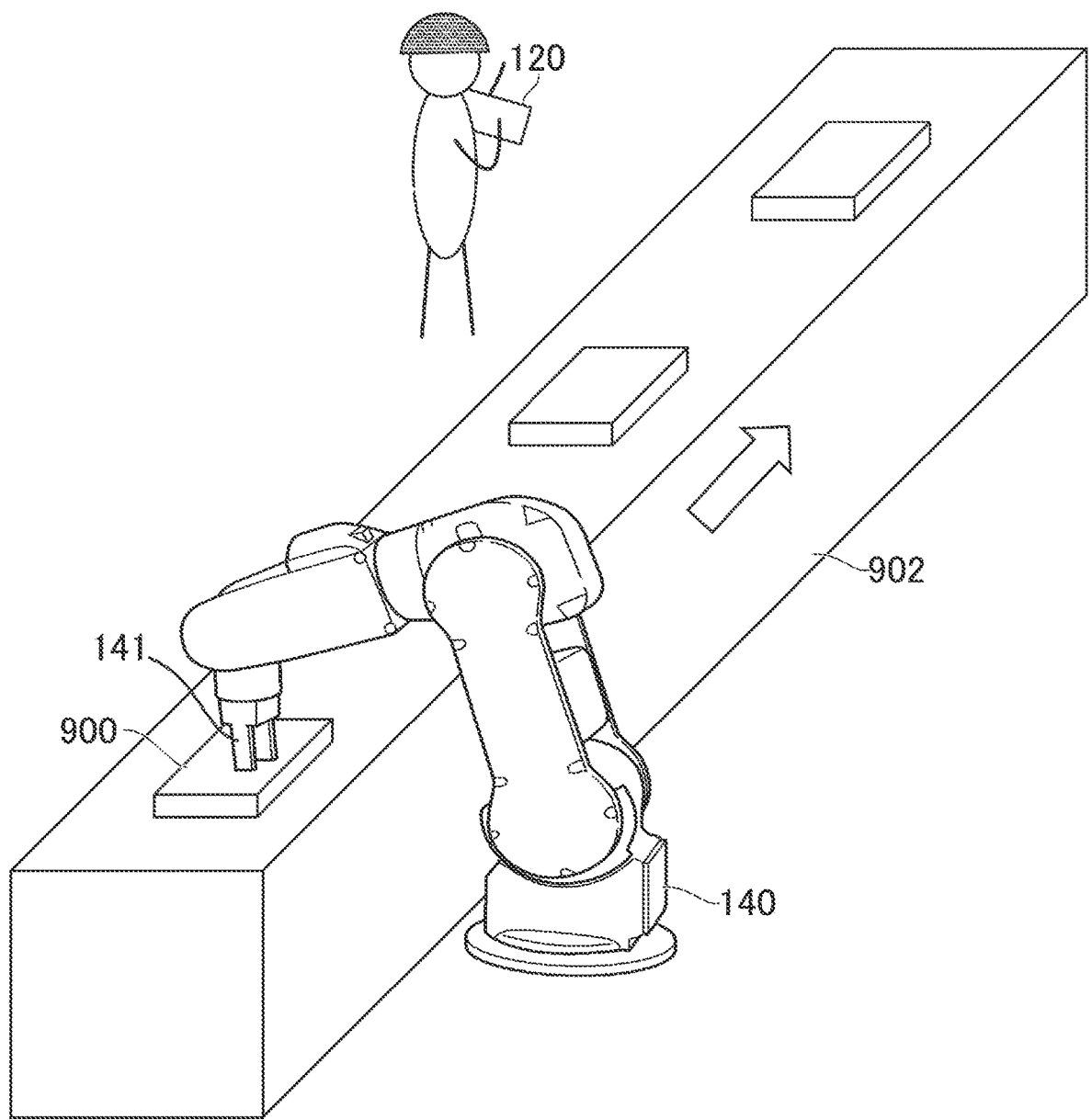
FIG. 9 is a diagram illustrating an example of an aspect in which an inspection method is performed in a factory.

In the flow of FIG. 8, the embodiment in which the processes up to the third determination are performed has been described, but processes similar to those from S808 to S820 may be repeatedly performed after the process of S820. By repeatedly executing the same learning as the second learning, the accuracy of the determination can be further improved.

Although the embodiment according to the present invention has been described above, the specific configuration shown in the embodiment is shown as an example, and the technical scope of the present invention is not intended to be limited thereto. Those skilled in the art may appropriately modify these disclosed embodiments, and it should be understood that the technical scope of the invention disclosed in this specification includes such modifications.

For example, the present invention includes a program that causes a computer to execute the determination step, the acquisition step, and the update step. Here, the determination step is a step of determining whether or not each of the plurality of objects belongs to the predetermined attribute by the machine learning unit 202 based on the feature data of each of the plurality of objects. The acquisition step is a step of acquiring the feature data of the object for which the determination result that the object belongs to the predetermined attribute is obtained regardless of the machine learning unit 202 among the objects for which the determination result that the object does not belong to the predetermined attribute is obtained by the machine learning unit 202. The updating step is a step of updating the learning parameter of the machine learning unit 202 based on the teaching data including the acquired feature data.

What is claimed is:

1. An inspection system comprising:
machine learning circuitry configured to determine whether each of objects belongs to a non-defective item attribute based on feature data of each of the objects;
feature data acquisition circuitry configured to acquire feature data of reevaluated non-defective objects which are determined to belong to the non-defective item attribute without using the machine learning circuitry among excluded objects which have been determined not to belong to the non-defective item attribute by the machine learning circuitry; and
parameter update circuitry configured to update a learning parameter of the machine learning circuitry based on teaching data including the acquired feature data acquired by the feature data acquisition circuitry.

2. The inspection system according to claim 1, wherein a probability that the machine learning circuitry determines that the objects which belong to the non-defective item attribute do not belong to the non-defective item attribute is higher than a probability that the machine learning circuitry determines that the objects which do not belong to the non-defective item attribute belong to the non-defective item attribute with respect to a teaching data group for a test.

3. The inspection system according to claim 2, wherein a probability that the machine learning circuitry determines that the objects which do not belong to the non-defective item attribute belong to the non-defective item attribute with respect to a teaching data group for a test is substantially equal to 0%.

4. The inspection system according to claim 1, wherein the parameter update circuitry is configured to update the learning parameter of the machine learning circuitry so as to suppress an increase in a probability that the objects which do not belong to the non-defective item attribute belong to the non-defective item attribute with respect to the teaching data group for a test.

5. The inspection system according to claim 4, wherein the parameter update circuitry is configured to update the learning parameter of the machine learning circuitry based on the teaching data including feature data of reexcluded objects which are determined not to belong to the non-defective item attribute among the excluded objects without using the machine learning circuitry.

6. The inspection system according to claim 5, wherein the parameter update circuitry is configured to update the learning parameter of the machine learning circuitry based on the teaching data including feature data extracted such that a number of the feature data of the reexcluded objects is substantially equal to a number of the feature data of the reevaluated objects.

7. The inspection system according to claim 5, wherein the parameter update circuitry is configured to update the learning parameter of the machine learning circuitry based on the teaching data including feature data of objects selected based on a probability that the reexcluded objects belong to the non-defective item attribute.

8. The inspection system according to claim 4, wherein the machine learning circuitry has learned in advance based on basic teaching data, and wherein the parameter update circuitry is configured to update the learning parameter of the machine learning circuitry based on at least a part of the basic teaching data.

9. The inspection system according to claim 4, wherein the parameter update circuitry is configured to update the learning parameter of the machine learning circuitry based on the teaching data including feature data of objects which are determined to belong to the non-defective item attribute by the machine learning circuitry.

10. The inspection system according to claim 1, further comprising:
a terminal device to which a determiner inputs a determination result with respect to the reevaluated objects.

11. The inspection system according to claim 10, wherein the terminal device includes a display that is configured to display feature data of the excluded objects.

12. The inspection system according to claim 11, further comprising:
a transport device configured to transport the objects, the display being configured to display feature data of a closest object closest to the determiner among the objects which are being transported.

13. The inspection system according to claim 12, further comprising:
a robot comprising:
  a processing part configured to perform processing on the objects which are being transported; and
  the feature data acquisition circuitry configured to acquire the feature data based on a result of the processing; and
a feature data storage configured to store the feature data acquired by the feature data acquisition circuitry.

14. The inspection system according to claim 1, wherein the machine learning circuitry is configured
to calculate a score indicating a probability for each of the objects that each of the objects belongs to the non-defective item attribute, and
to determine whether each of the object belongs to the non-defective item attribute based on whether the score is greater than a predetermined first threshold value.

15. The inspection system according to claim 14, wherein the parameter update circuitry is configured to update the learning parameter of the machine learning circuitry based on the teaching data including feature data of the object that is selected by comparing the score with a predetermined second threshold among the objects for which the determination result of not belonging to the non-defective item attribute is obtained without depending on the machine learning circuitry.

16. The inspection system according to claim 1, further comprising:
a display configured to display feature data of the excluded objects which are determined not to belong to a non-defective item attribute by the machine learning circuitry;
an input unit via which a determiner is configured to input a determination result that the determiner determines whether the excluded objects belong to the non-defective item attribute based on the feature data of the excluded objects displayed on the display; and
a communication unit configured to transmit the determination result.

17. An inspection method comprising:
determining whether each of objects belongs to a non-defective item attribute based on feature data of each of the objects;
acquiring feature data of reevaluated non-defective objects which are determined to belong to the non-defective item attribute without using the machine learning circuitry among excluded objects which have been determined not to belong to the non-defective item attribute by the machine learning circuitry; and
updating a learning parameter based on teaching data including the acquired feature data.

18. A non-transitory computer readable storage medium retrievably storing a computer-executable program therein, the computer-executable program causing a computer to perform an inspection method, the inspection method comprising:
determining whether each of objects belongs to a non-defective item attribute based on feature data of each of the objects;
acquiring feature data of reevaluated non-defective objects which are determined to belong to the non-defective item attribute without using the machine learning circuitry among excluded objects which have been determined not to belong to the non-defective item attribute by the machine learning circuitry; and
updating a learning parameter based on teaching data including the acquired feature data.

* * * * *